United States Patent [19]

Hall

[11] 3,995,362

[45] Dec. 7, 1976

[54] TAPER PIN REMOVER

[76] Inventor: Wayne C. Hall, 15 Hillside Ave., Hastings-on-Hudson, N.Y. 10706

[22] Filed: Mar. 25, 1975

[21] Appl. No.: 561,932

[52] U.S. Cl. .................................................. 29/257
[51] Int. Cl.² .......................................... B23P 17/04
[58] Field of Search ............. 29/257, 256, 263, 264

[56] References Cited

UNITED STATES PATENTS

| | | | |
|---|---|---|---|
| 1,010,188 | 11/1911 | Scott | 81/61 |
| 3,305,921 | 2/1967 | Morse | 29/263 |
| 3,307,250 | 3/1967 | Goodwin et al. | 29/257 |
| 3,334,405 | 8/1967 | Cann et al. | 29/257 |
| 2,834,099 | 5/1958 | Gasper | 29/257 |

*Primary Examiner*—James L. Jones, Jr.
*Attorney, Agent, or Firm*—E. Leigh Hunt

[57] ABSTRACT

Disclosed is a taper pin remover comprising a housing having one end adapted to receive a hub assembly containing a tapered pin with a portion of the tip of the pin protruding from the exterior of the hub, said housing having a drive pin screw means arranged to press the hub against the opposite side of the hub receiving end to force the protruding tip of the taper pin backwardly to release the taper pin from its tight engagement with the hub and shaft passing therethrough.

6 Claims, 8 Drawing Figures

TAPER PIN REMOVER

BACKGROUND OF THE INVENTION

This invention relates to hand tools and more particularly to a taper pin remover for removing pin fasteners used for connecting mechanical members to drive shafts.

In the assembly of precision mechanical equipment involving levers and gears being mounted on shafts it is common practice to connect such members to the drive shaft by forcing a taper pin of hardened steel diametrically through the gear hub or lever hub and associated drive shaft. In the event that it is necessary to repair the equipment or machine, it is quite often necessary to remove various gears and levers from their associated drive shafts. In many instances it is extremely difficult to get to the tip of the taper pin in order to remove it and it is time consuming and quite often requires two people working for a number of hours. In addition, with the conventional hammer and punch methods, extreme care must be taken to avoid damaging the equipment as well as the associated shafts and pin holes.

This invention provides a new and improved means for removing such taper pins, roll pins or the like and is particularly valuable where the shafts and associated pins connecting the mechanical members are deep within the machine assembly and where it is not desirable to remove the drive shaft from the machine.

U.S. Pat. No. 3,307,250 to Goodwin, et. al., dated Mar. 7, 1967, discloses a taper pin driver having a hook shaped end with a recess for receiving the pin. The pin driver illustrated in Goodwin involves a drive pin having a small tip bearing directly on the head or tip of the taper pin to be removed. Such an apparatus is incapable of providing a high pressure concurrently with positive control over the pin and machine assembly as in the instant invention wherein the large drive pin bears directly against the hub containing the taper pin. Also, Goodwin requires careful alignment of the drive pin with the tip of the pin to be removed or inserted.

SUMMARY OF THE INVENTION

The invention is defined as a taper pin remover comprising in combination:

a. a housing,
   1. said housing having a hub receiving end adapted to receive and engage a hub and taper pin passing therethrough to be removed,
   2. said housing having a bore extending longitudinally from the end opposite the hub receiving end and into the hub engaging end, at least a portion of the bore being threaded and adapted to receive a screw member and a portion of the bore between the threaded portion and the hub engaging end being adapted to receive a slidably mounted drive pin;

b. a drive pin slidably mounted within the bore of the housing having a hub urging end adapted to mate with said hub and taper pin and to urge pressure against the hub closely adjacent to the head of the taper pin without urging the head of the taper pin, said drive pin and taper pin being in substantial parallel alignment; and c. a screw member threadably mounted within the threaded portion of the bore of the housing and adapted to be threaded into and out of said threaded bore of said housing, whereby said screw member when threaded inwardly urges the drive pin against the hub closely adjacent to the head of the taper pin to urge the opposite small protruding end of the taper pin against the hub receiving end of the housing to force the taper pin backwardly out of its tight engagement with said hub and shaft passing therethrough.

Other preferred embodiments of the invention include the taper pin remover as above defined where in (a)(1) the hub receiving end comprises a hooked shaped member adapted to receive and engage the hub and taper pin to be removed. For certain applications involving extremely close and tight areas spacewise, it may be preferred to have a taper pin remover as above defined where in (a)(1) the hub receiving end comprises a thin band means adjustably secured to the housing and adapted to encircle and tightly grip the hub and the protruding tip of the taper pin.

A preferred embodiment is as above defined wherein in (b) the drive pin urging end has a relief slot adapted to receive the head of the taper pin without exerting substantial pressure on the taper pin.

Another desirable embodiment is the remover as above wherein in (a)(1) the hub receiving end has a raised portion adapted to mate with the axis of the tip of the taper pin to be removed to facilitate removal of flush or recessed pins.

The invention in its broader aspects is defined as a taper pin remover comprising in combination:

a. a housing,
   1. said housing having a hub receiving end adapted to receive and engage a hub and taper pin passing therethrough to be removed,
   2. said housing having a bore extending longitudinally into the hub receiving end and said bore being adapted to receive a slidably mounted drive pin;

b. a drive pin slidably mounted within the bore of the housing having a hub urging end adapted to mate with said hub and taper pin and to urge pressure against the hub closely adjacent to the head of the taper pin without urging the head of the taper pin, said drive pin and taper pin being in substantial parallel alignment; and c. urging means operatively associated with said drive pin and housing adapted to urge the drive pin inwardly against the exterior of the hub and associated taper pin to be removed, whereby the opposite small protruding end of the taper pin is urged against the hub receiving end of the housing to force the taper pin backwardly out of its tight engagement with said hub and shaft passing therethrough.

Other means for urging the drive pin against the hub are included within the spirit and scope of the invention. It is envisioned that hydraulic and/or other means that would be suitable substitutes in particular situations for the screw means as exemplified.

DESCRIPTION OF THE PREFERRED EMBODIMENTS

DETAILED DESCRIPTION OF THE DRAWINGS.

Throughout the drawings, the same numeral refers to the identical part of means.

Figure 2:
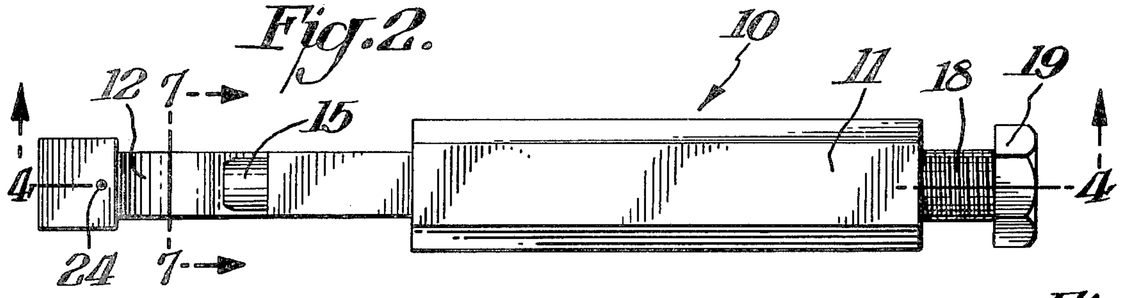
FIG. 2 is a top elevational view of the taper pin remover shown in FIG. 1 without the presence of the machine assembly containing the taper pin to be removed.
Figure 1:
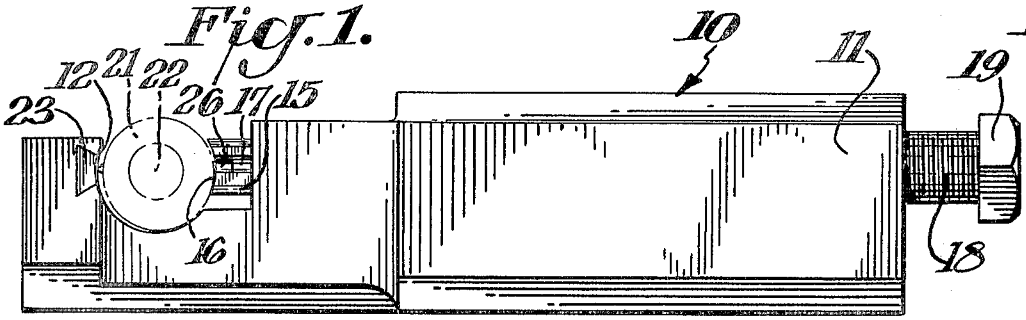
FIG. 1 is a side elevational view of a taper pin remover of this invention showing its engagement with a hub and shaft having a tapered pin passing therethrough.
Figure 3:
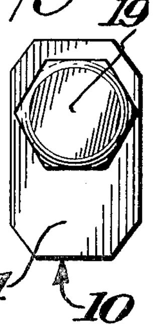
FIG. 3 is an end view of FIG. 1 looking from the right hand side of FIG. 1 inwardly towards the taper pin remover.
Figure 4:
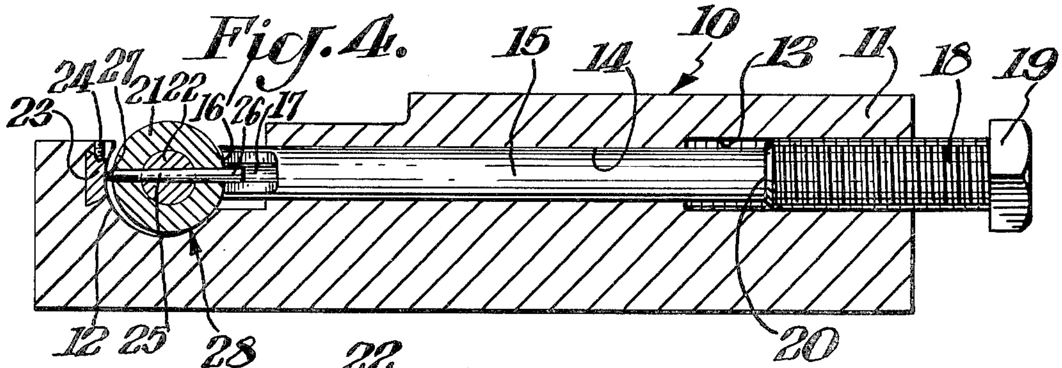
FIG. 4 is a longitudinal cross-sectional view of the tapered pin remover and the machine assembly containing the taper pin illustrated in FIG. 1 and FIG. 2 taken through line 4—4 of FIG. 2.
Figure 6:
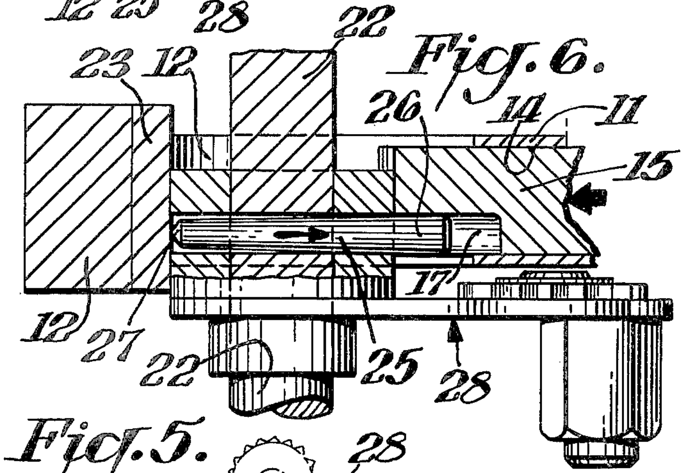
FIG. 6 is a cross-sectional view along line 6—6 of FIG. 5.
Figure 7:
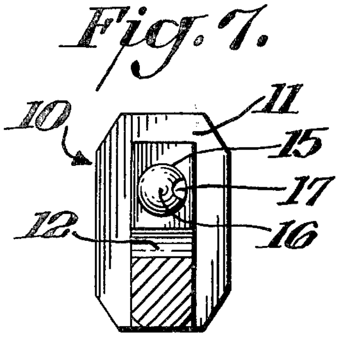
FIG. 7 is a cross-sectional taken through line 7—7 of FIG. 2 illustrating the head or urging end and relief slot of the driven pin.
Figure 5:
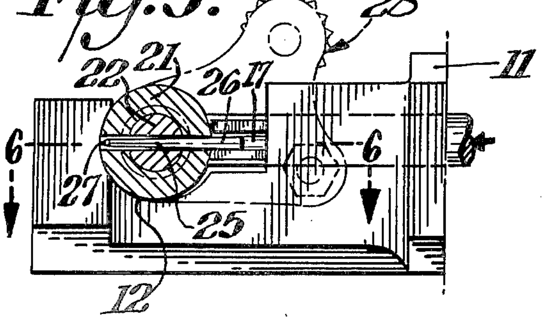
FIG. 5 is a partial broken away side view of the hub and the pin receiving end of the pin remover illustrated with a machine assembly containing a taper pin passing through a hub and shaft.

In FIG. 1, which shows a preferred embodiment of the invention, the pin remover is illustrated as 10 and the housing as 11. The housing 11 has a hub 21 and taper pin 25 receiving end 12. As illustrated in FIG. 4, the housing 11 has a longitudinal bore passing therethrough with a portion of the bore being threaded 13 and an additional section of the bore 14 being adapted to receive a slidably mounted drive pin 15. The drive pin 15 has an urging end 16 for urging the hub 21 containing the taper pin 25 against the opposite side of the hub and pin receiving end 12. In a preferred embodiment the head of the drive pin 15 has a recess 17 providing a relief slot to receive the taper pin head 26 without subjecting the head to any substantial pressure. Screw member 18 is adapted to be threaded inwardly or outwardly from within the threaded portion 13 of the bore by means of head 19 which could be a T-handle or some other means. The screw means 18 has an end 20 adapted to urge the drive pin 15 longitudinally against the hub 21 closely adjacent to the head 26 of the taper pin 25. The drive pin 15 and the taper pin 25 are in substantial parallel alignment. Throughout the drawings the hub 21 containing shaft 22 is illustrated for the portion of the machine assembly 28 being worked upon. As the tip 27 of the taper pin 25 urges against the portion of the hub receiving end 12 of the assembly, it is desirable to have an extremely hard metal insert 23 retained by its dove-tail fit and set screw 24 to receive the pin tip 27 of the hard metal taper pin 25. Such an arrangement provides for longer life of the housing as that is the point of maximum pressure within the system.

Figure 8:
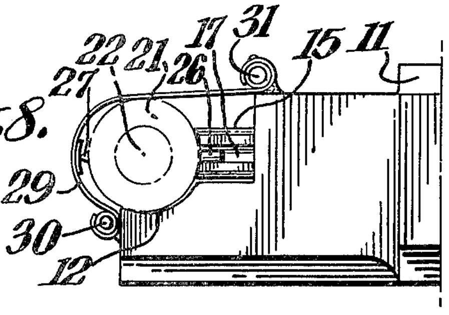
FIG. 8 is a partial broken away side elevational view of the hub receiving end involving another embodiment of the invention wherein the hub receiving end, because of space limitations within the equipment having the taper pin, comprises a thin metal band being adjustibly connected to the housing.

In FIG. 8 is illustrated another embodiment of the invention containing a modified hub receiving end 12 for working in particularly close or tight tolerances. In FIG. 8 the hub receiving end 12 comprises a thin metal band 29 being affixed to the housing by retaining means 30 and 31. The thin metal band 29 is adapted to be released and pulled around the hub assembly and the protruding tip 27 of the taper pin to tightly engage the hub 21 and taper pin 25.

The apparatus of this invention provides a vast improvement over the prior known methods for servicing such machines containing taper pins designed to affix gears and/or levers to drive shafts. Due to the normal position of these pins the small end from which it has to be driven to be removed are very poorly accessible. It is normally driven out by an angled punch and a hammer or a J-shaped "apple knocker", often requiring an extra person to stabilize the machine and part during the driving operation. In addition, in such operations extreme caution must be taken to avoid damaging the equipment as ofttimes the percussion of these driving procedures cause the pin to mushroom on the small end instead of being driven out. When this occurs, the counter section must be removed from the machine by turning the shaft over and drilling the pin out requiring an extra two to three man hours. The normal removal procedure of the prior art takes at least 30 minutes to one and one-half hours by one or two men.

It has been found that with the use of the tool and apparatus of this invention the necessary pins can be removed from a given machine in less than 15 minutes without any assistance. The apparatus is highly advantageous, especially in areas where there is poor access to the equipment and to the small end of the taper pin. The apparatus is applicable and operable with all sizes of taper pins, roll pins or the like in all types of machinery, including bookkeeping and accounting machines. Various size and shaped arbors and feet will permit flush or recessed pin tips to be be removed.

In situations wherein the small end of the taper pin does not protrude from its associated hub, hardened metal insert 23 can be exchanged for a metal insert having a protrusion that can align with the axis of the tip 27 of the taper pin 25 and the operation and removal will be similar as above described.

The taper pin remover of this invention is particularly useful in removing tapered pins that are associated with hubs or levers having a limited rotating axis of less than 180 degrees. The tool of this invention is also highly useful with regard to removing tapered pins in hubs or levers that are not located in a central position on the hubs or levers. Thus, the tool has great utility with regard to being used as an offset or center pin remover.

The tool of this invention thus provides a means for overcoming a troublesome problem in the art in that the taper pins are removed in a vastly shorter period of time with far less damage or potential damage to the associated equipment.

I claim:

1. A taper pin remover comprising in combination:

a. a housing, 1. said housing having a hub receiving end formed to receive and engage a circumferential portion of the hub and taper pin passing therethrough to be removed, said hub receiving end having a hardened nonresilient portion arranged to mate with and urge longitudinally against a normally small protruding tip of said taper pin to provide axial longitudinal forces to said taper pin,
2. said housing having a bore extending longitudinally from the end opposite the hub receiving end and into the hub engaging end, at least a portion of the bore being threaded and formed to receive an operatively associated screw member and a portion of the bore between the threaded portion and the hub engaging end is operatively associated with a slidably mounted drive pin;

b. a drive pin slidably mounted within the bore of the housing having a hub urging end cut away and formed to mate with said hub and taper pin to urge pressure against the hub towards the hardened nonresilient portion at a point closely adjacent to the head of the taper pin without urging the head of the taper pin, said drive pin having a cavity cut into one side at the hub urging end formed and shaped to receive a protruding head of the taper pin with said cavity being larger than said head of the taper pin to allow for movement of said taper pin within said cavity, said drive pin and taper pin being in substantial parallel alignment;

c. a screw member threadably mounted within the threaded portion of the bore of the housing that is screwable into and out of said threaded bore of the housing, and which has an inward end operatively associated with the drive pin to urge the drive pin against the hub at a location closely adjacent to the head of the taper pin to urge the opposite small protruding tip of the taper pin against the hub receiving end of the housing to force the taper pin backwardly out of its tight engagement with said hub and shaft passing therethrough.

2. The taper pin remover as in claim 1 wherein in (a)(1) the hub receiving end comprises a hook shaped member adapted to receive and engage the hub and taper pin.

3. The taper pin remover as in claim 1 wherein in (a)(1) the hub receiving end comprises a thin band means adjustably secured to the housing and adapted to encircle and tightly grip the hub and the protruding tip of the taper pin.

4. The taper pin remover as in claim 1 wherein in (a)(1) the drive pin urging end has a relief slot adapted to receive the head of the taper pin without exerting substantial pressure on the taper pin.

5. The taper pin remover as in claim 1 wherein in (a)(1) the hub engaging end comprises a removably hardened metal portion adapted to receive the tip of the taper pin to be removed.

6. The taper pin remover as in claim 1 wherein in (a)(1) the hub receiving end has a raised portion adapted to mate with the axis of the tip of the taper pin to be removed to facilitate removal of flush or recessed pins.

* * * * *